(12) United States Patent
Friedt et al.

(10) Patent No.: US 9,449,032 B2
(45) Date of Patent: Sep. 20, 2016

(54) MULTI-BUFFERING SYSTEM SUPPORTING READ/WRITE ACCESS TO DIFFERENT DATA SOURCE TYPE

(71) Applicant: SAP AG, Walldorf (DE)

(72) Inventors: Martin Friedt, Walldorf (DE); Hans-Georg Beuter, Walldorf (DE); Helidon Dollani, Walldorf (DE); Michael Wilking, Walldorf (DE); Gregor Dieckmann, Walldorf (DE); Ingo Raasch, Walldorf (DE); Stefan Dipper, Walldorf (DE)

(73) Assignee: SAP SE, Walldorf (DE)

( * ) Notice: Subject to any disclaimer, the term of this patent is extended or adjusted under 35 U.S.C. 154(b) by 250 days.

(21) Appl. No.: 13/867,927

(22) Filed: Apr. 22, 2013

(65) Prior Publication Data

US 2014/0317149 A1    Oct. 23, 2014

(51) Int. Cl.
*G06F 7/00* (2006.01)
*G06F 17/30* (2006.01)

(52) U.S. Cl.
CPC ... *G06F 17/30289* (2013.01); *G06F 17/30557* (2013.01)

(58) Field of Classification Search
CPC ............... G06F 17/30557; G06F 17/3056; G06F 17/30587
See application file for complete search history.

(56) References Cited

U.S. PATENT DOCUMENTS

| | | | | |
|---|---|---|---|---|
| 5,235,693 A | * | 8/1993 | Chinnaswamy et al. | ...... 711/159 |
| 5,383,975 A | * | 1/1995 | Faxon | ............ B08B 9/0495 134/167 C |
| 5,684,693 A | * | 11/1997 | Li | ............ E21B 47/12 702/6 |
| 5,724,241 A | * | 3/1998 | Wood | ............ G01V 1/20 702/14 |
| 5,801,717 A | * | 9/1998 | Engstrom et al. | ............ 345/539 |
| 5,802,287 A | * | 9/1998 | Rostoker et al. | ......... 370/395.5 |
| 5,838,334 A | * | 11/1998 | Dye | ............ 345/503 |
| 5,854,750 A | * | 12/1998 | Phillips | ............ G06F 9/466 700/216 |
| 5,995,120 A | * | 11/1999 | Dye | ............ 345/543 |
| 6,002,411 A | * | 12/1999 | Dye | ............ 345/542 |
| 6,178,121 B1 | * | 1/2001 | Maruyama | ......... G11C 11/4074 365/149 |
| 6,181,609 B1 | * | 1/2001 | Muraoka | ............ G11C 7/1051 365/189.05 |
| 6,192,370 B1 | * | 2/2001 | Primsch | ............ G06F 17/30607 |

(Continued)

OTHER PUBLICATIONS

Leung et al, "A Mapping for multi-GPGPU Accelerated Computers from a Portable High Level Programming Abstraction". ACM 2010.*

(Continued)

*Primary Examiner* — Daniel Kuddus
(74) *Attorney, Agent, or Firm* — Fountainhead Law Group PC

(57) ABSTRACT

Embodiments provide a multi-buffering system in an application layer to support unified read/write access to different data source types of an underlying database layer. In a particular embodiment, the database layer comprises both a multi-dimensional data source (e.g. a cube), and another data source type (e.g. a Data Store Object—DSO). An abstract buffer component of the multi-buffering system is specialized into a delta buffer configured to read/write data of the cube, and into an after image buffer configured to read/write data of the DSO. A storage mechanism component of the multi-buffering system is specialized into a cache store configured to read/write data of the cube, and a calculation scenario store configured to read/write data of the DSO. The after image buffer may support certain aggregation rules during a DSO read/write operation. The calculation scenario store may leverage capabilities of an in memory database during a DSO read/write operation.

11 Claims, 7 Drawing Sheets

Class diagram for planning buffers

(56) References Cited

U.S. PATENT DOCUMENTS

| | | | | |
|---|---|---|---|---|
| 6,449,685 | B1 * | 9/2002 | Leung | 711/106 |
| 6,567,091 | B2 * | 5/2003 | Dye | G09G 5/14 |
| | | | | 345/501 |
| 6,587,091 | B2 * | 7/2003 | Serpa | G06F 3/016 |
| | | | | 345/156 |
| 6,871,201 | B2 * | 3/2005 | Yu et al. | 707/737 |
| 6,871,206 | B2 * | 3/2005 | Henry et al. | 708/250 |
| 7,475,207 | B2 * | 1/2009 | Bromling | G06F 11/2064 |
| | | | | 709/214 |
| 7,487,189 | B2 * | 2/2009 | Whitlock | G06Q 10/10 |
| 7,530,791 | B2 * | 5/2009 | Douville et al. | 416/220 R |
| 7,707,341 | B1 * | 4/2010 | Klaiber | G06F 9/45533 |
| | | | | 710/244 |
| 7,842,843 | B2 * | 11/2010 | Tokuyasu et al. | 568/657 |
| 7,930,449 | B2 * | 4/2011 | Tinsman et al. | 710/52 |
| 7,996,828 | B2 * | 8/2011 | Massmann | G06F 9/44505 |
| | | | | 715/825 |
| 8,082,293 | B1 * | 12/2011 | Doyle et al. | 709/202 |
| 8,095,740 | B2 * | 1/2012 | Hartwich et al. | 711/147 |
| 8,223,157 | B1 * | 7/2012 | Baldwin et al. | 345/501 |
| 8,643,659 | B1 * | 2/2014 | Baldwin | 345/557 |
| 2002/0141525 | A1 * | 10/2002 | Behrens et al. | 375/372 |
| 2004/0088386 | A1 * | 5/2004 | Aggarwal | G06F 11/3495 |
| | | | | 709/220 |
| 2004/0123010 | A1 * | 6/2004 | Moyer | 710/305 |
| 2005/0108294 | A1 * | 5/2005 | Koerner | G06F 17/30592 |
| 2005/0135895 | A1 * | 6/2005 | Valentine | B60P 7/12 |
| | | | | 410/50 |
| 2006/0053234 | A1 * | 3/2006 | Kumar | G06Q 10/08 |
| | | | | 710/11 |
| 2007/0156752 | A1 * | 7/2007 | Becker | G06Q 30/06 |
| 2007/0294682 | A1 * | 12/2007 | Demetriou | G06F 8/45 |
| | | | | 717/153 |
| 2008/0104085 | A1 * | 5/2008 | Papoutsakis | G06F 17/30306 |
| 2008/0162564 | A1 * | 7/2008 | Massmann | G06F 9/44505 |
| 2009/0150588 | A1 * | 6/2009 | Wang et al. | 710/110 |
| 2010/0218196 | A1 * | 8/2010 | Leung | G06F 8/453 |
| | | | | 718/107 |
| 2010/0235335 | A1 * | 9/2010 | Heman | G06F 17/30345 |
| | | | | 707/703 |
| 2012/0226668 | A1 * | 9/2012 | Dhamankar | G06F 17/30303 |
| | | | | 707/690 |
| 2013/0179473 | A1 * | 7/2013 | Heman | G06F 17/30345 |
| | | | | 707/797 |
| 2013/0290282 | A1 * | 10/2013 | Faerber | G06F 17/30153 |
| | | | | 707/693 |
| 2014/0136788 | A1 * | 5/2014 | Faerber | G06F 17/30315 |
| | | | | 711/133 |

OTHER PUBLICATIONS

Xianxun, Li, WO 2010/148922 A1; WIPO 2010.*

* cited by examiner

Class diagram for planning buffers

Class diagram for planning buffers stores

# MULTI-BUFFERING SYSTEM SUPPORTING READ/WRITE ACCESS TO DIFFERENT DATA SOURCE TYPE

BACKGROUND

Embodiments of the present invention relate to a Data Warehouse Planning Application that is based on a Data Warehouse System, and in particular, to reading of stored information and writing new or change information.

Unless otherwise indicated herein, the approaches described in this section are not prior art to the claims in this application and are not admitted to be prior art by inclusion in this section.

Data Warehouse Systems are commonly employed in computing systems, in order to store and organize information. A Data Warehouse system may include a database, a program for accessing the database, and any number of mechanisms to access and change records in the database.

In a Data Warehouse System Application, the types of operations that are carried out by tools accessing the database, may include but are not limited to: reporting, manual planning (interactive planning), and planning functions (automated planning) Such a Data Warehouse Planning Application may include, for example, a buffer that reads a selection of data from a database into program memory, and a mechanism that allows changes of data during a planning session.

Data Warehouse Systems using conventional databases have relied upon data sources in multidimensional form (for example a cube structure). However using an In Memory technology in the database layer (for example the HANA™ in memory database available from SAP AG) allows accessing data with high performance. With such in memory database technology, it is no longer required to use special types of data sources in order to achieve high performance.

Accordingly, the present disclosure provides methods and apparatuses for database to access and change data with high performance in Data Warehouse Planning Applications.

SUMMARY

Embodiments provide a multi-buffering system in an application layer supporting unified read/write access to different data source types of an underlying database layer. In a particular embodiment, the database layer comprises both a multi-dimensional data source (e.g. a cube), and another data source type (e.g. a Data Store Object—DSO). An abstract buffer component of the multi-buffering system is specialized into a delta buffer configured to read/write data of the cube, and into an after image buffer configured to read/write data of the DSO. A storage mechanism component of the multi-buffering system is specialized into a cache store configured to read/write data of the cube, and a calculation scenario store configured to read/write data of the DSO. The after image buffer may support certain aggregation rules during a DSO read/write operation. The calculation scenario store may leverage capabilities of an in memory database during a DSO read/write operation.

An embodiment of a computer-implemented method comprises providing in a database layer, a first data source of a first type and a second data source of a second type different from the first data source type. A multi-buffering system is provided in an application layer in communication with the database layer. An abstract buffer component of the multi-buffering system is caused to support unified read/write access to the first data source and to the second data source by a consumer.

An alternative embodiment of a computer-implemented method comprises providing in a database layer, a first data source of a first type and a second data source of a second type different from the first type. A multi-buffering system is provided in an application layer in communication with the database layer. A storage mechanism of the multi-buffering system is caused to support unified read/write access to the first data source and to the second data source by the consumer.

An embodiment of a non-transitory computer readable storage medium embodies a computer program for performing a method comprising providing in a database layer, a first data source of a first type and a second data source of a second type different from the first type. The method further comprises providing a multi-buffering system in an application layer in communication with the database layer. The method further comprises causing an abstract buffer component of the multi-buffering system, to support unified read/write access to the first data source and to the second data source by a consumer.

In certain embodiments, the buffering mechanism may further comprise causing a storage mechanism of the multi-buffering system, to support unified read/write access to the first data source and to the second data source by the consumer.

According to some embodiments the first data source comprises a multi-dimensional data structure, and the second data source comprises other than a multi-dimensional data structure.

In particular embodiments the abstract buffer component is specialized into a delta buffer configured to receive data read from access the first data source, and an after image buffer configured to receive data read from access the second data source.

In various embodiments the after image buffer is configured to support a No Operation (NOP) aggregation rule.

The storage mechanism may be specialized into a cache store configured to write data to access the first data source, and a calculation scenario store configured to write data to access the second data source.

In certain embodiments the database layer comprises an in memory database, and the calculation scenario store is configured to use functionality of the in memory database in order to manage a calculation scenario.

The following detailed description and accompanying drawings provide a better understanding of the nature and advantages of particular embodiments.

DETAILED DESCRIPTION

Figure 1:
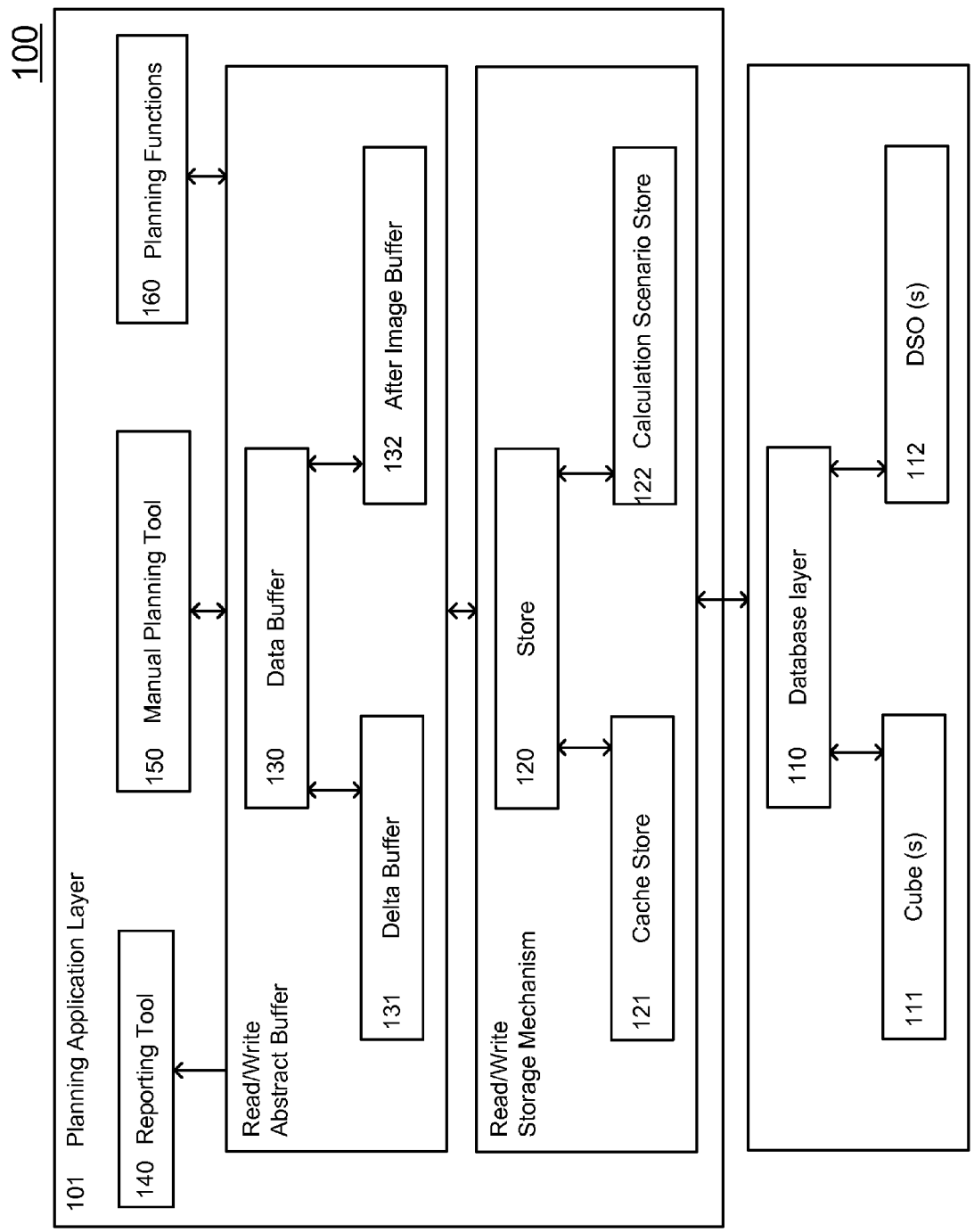
FIG. 1 is simplified block diagram of a database system according to an embodiment including an after image buffer.

The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Data sources can be configured so that the technical key is the same as the logical key. But, there are also use cases where the technical key differs from the logical key. There are several reasons why the logical key might be different from the technical key. For example, technical restrictions concerning the allowed number of key fields in a data source may be limited for a database system, or that a performance advantage is gained for read- or write-access via such a technique.

Reporting and planning might often operate on aggregated data. For key figures, aggregation rules are defined. Many database systems offer aggregation options during read access. Such database aggregation is usually executed on the level of the technical key defined in the database system.

Whether the database option to aggregate data can be used in a special scenario, depends on the aggregation rule and on the configuration of the data source (e.g. whether the technical key is the same as the logical key).

Examples of aggregation rules that are often used are: summation, maximum, minimum. Another aggregation rule is the No Operation (NOP) rule. For NOP, if the value of the key figure in all relevant records with respect to the logical key is the same value, then the aggregation result is this value. Otherwise, the aggregation result is no value.

Embodiments relate to a Data Warehouse Planning Application that includes a multi buffering mechanism. This buffering mechanism might comprise different types of buffers to support the particular needs of different data sources on a database level.

Examples of differentiating properties for different data sources, may include whether a data source contains key figures which have an aggregation rule (during reporting), which requires that the aggregation is computed on technical key level, or whether the technical and the logical key are the same.

Another property which might determine how read or write access is handled with best performance, may be whether the type of the data source is capable of storing delta records, or whether only one record for the logical key is allowed.

Another property used for differentiation, may be an administrative one. For example, the property may be whether the data source shall be treated as write- or read-optimized.

According to embodiments, an "abstract buffer" mechanism is introduced to unify the read access for the different data sources. This abstract buffer may be specialized (e.g. a delta buffer and an after image buffer). In such an embodiment, the delta buffer is able to deliver delta key figure values for changed data. This might be an optimal approach where the data source allows adding delta records for a logical key in the data source. The after image buffer is appropriate for data sources which only allow one record for one logical key.

To take advantage of the capabilities of a database system as an In Memory database, it still might be necessary to access the different types of data sources with different methods (hereafter "store class" or "store"). Examples of differences which could influence the access method may include:
the data volume stored in the data source;
whether the data source is configured as read- or write-optimized;
whether the technical key is the same as the logical key; or which aggregation shall be performed during a read access.

A "storage mechanism" may be introduced to take advantage of the different capabilities of the data sources. An example of a specialized storage type might be a session specific cache implemented in the application layer of the Data Warehouse Planning Application. This cache contains all the data which are relevant in the planning session, including all the changed data records. Another example of a specialized storage type might use functionality available in the database layer. Such functionality might be available in an In Memory database. This storage type manages a calculation scenario. The calculation scenario contains the information as to how to calculate the data relevant in the planning session and all the parameters to get the changed data in this planning session. All storage types are capable of returning all the (in the planning session) relevant data in the changed state and save these data on user request.

Figure 4:
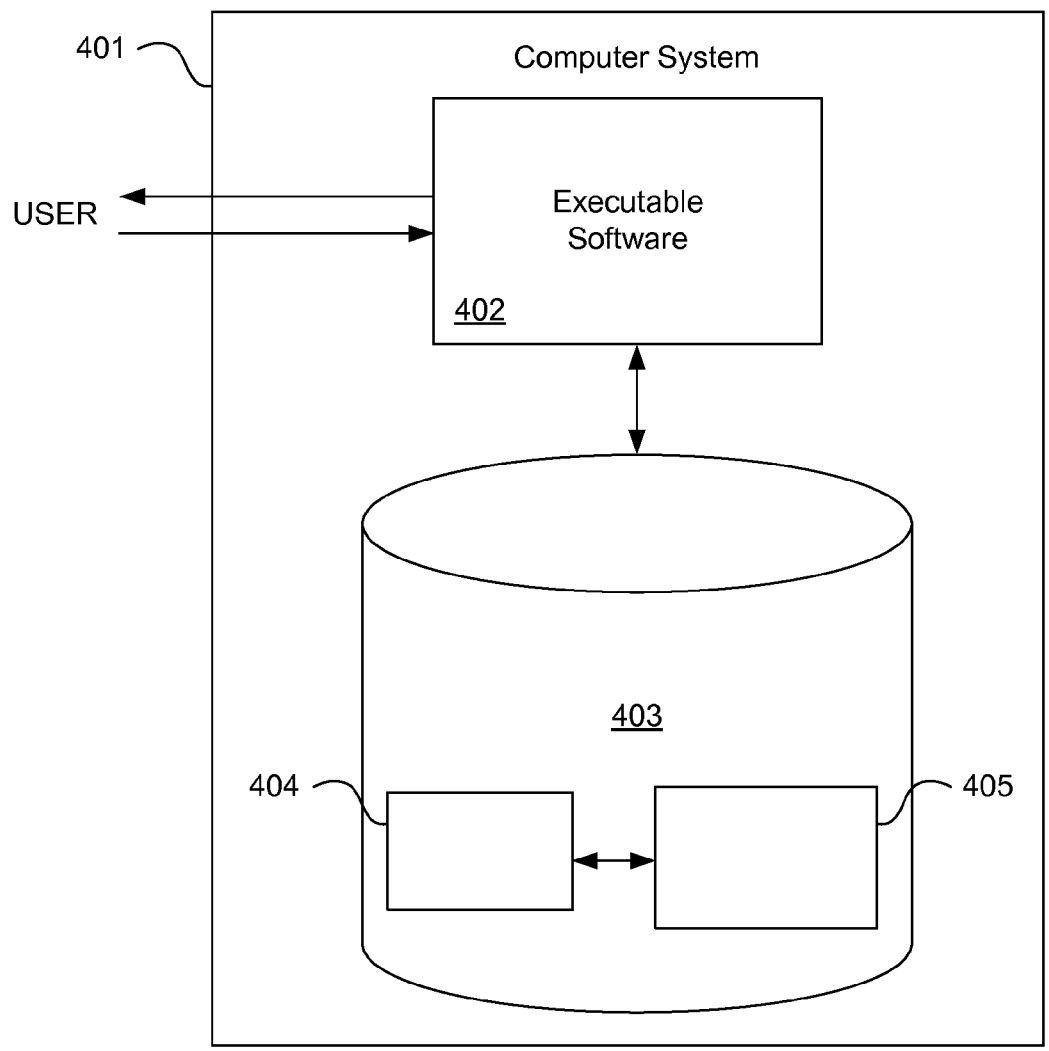
FIG. 4 illustrates hardware of a special purpose computing machine configured to perform data buffering according to an embodiment.

FIG. 4 illustrates hardware of a special purpose computing machine configured to implement one or several specialized buffers according to an embodiment as well as one or several types of stores. In particular, computer system 400 comprises a processor 402 that is in electronic communication with a non-transitory computer-readable storage medium 403. This computer-readable storage medium has stored thereon code 405 corresponding to an abstract buffer. Code 404 corresponds to a storage mechanism. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Technically, the execution of planning tasks on these data sources (e.g. as cubes and DSOs) commonly entails changing the data in a simulative manner. This can happen via direct user interaction on a planning sheet (where a user enters planning data), and/or via automatic planning functions where the planning software changes the data (e.g. automated forecast functions). Often, these changes shall to be visible to other sessions not step by step but only in common after a save operation was triggered by the user. These changes might be intended to analyze simulations which will be retraced after the analysis or the several changes have to be done in several steps to get the data in a consistent state before making the changes visible to other users. It has to be under the control when such changes are made visible to other users.

Accordingly, to allow interaction between the various tools (see 140, 150, and 160 of FIG. 1 discussed below) and the different data sources, the Data Warehouse Planning Application includes buffer(s) for buffering data in program memory. These buffers include a data buffer 130 (this data buffer may buffer data itself or work as integration unit for the different buffers), a delta buffer 131, and an after image buffer 132. In order to take advantage of an In Memory database technology such buffers might also contain the calculation operations which will be performed on database level (110) when data are requested for the consumers (140, 150, 160) or when the changes have to be persisted on in the database layer.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

A requirement of a planning application might be to give a user the possibility to change data in several steps without making this change visible to other user. This allows the user to simulate several scenarios and to change data, which have a semantic dependency and there it is necessary to adjust data in an iterative process to reach semantic consistency.

In a multiuser environment a planning application has to ensure that different users can change data concurrently, without overwriting data another user is currently working with. This can be done by a locking mechanism. To allow as much concurrency as possible, only the data a user has really requested should be locked. For example the scope of locking data can be defined by filter(s) which are used when data is read for changes. A filter defines selection criteria—so that only the required data are retrieved from the database.

The planning application needs to take into account that during a planning session, a user might widen the data to be worked on. This can be done by sending additional data requests to the database layer. The planning application needs to allow changes on data in different data sources during several steps without saving the changes. Only after such a save operation, will the changed data become visible to other users. No user may change data which fit to a filter that another user has locked. The data described by different filters might have intersections.

FIG. 1 is block diagram of an example of software including a database layer 110 and Data Warehouse Planning Application 101. The database layer may contain several data sources of different types (e.g. as DSOs 111 or cubes 112). The application 101 includes consumer as e.g. a reporting tool 140, a manual planning tool 150, or planning function 160. Additionally the application includes a buffer mechanism 130. The abstract buffer might be specialized (e.g. by a delta buffer 131 and an after image buffer 132). Additionally the application includes a storage mechanism 120. The abstract storage mechanism might be specialized (e.g. by a cache store 121 and calculation scenario store 122).

During the planning session, the user might change the view of data to be analyzed. A user might also change planning functions (the user might execute as step of a planning session). A user might need to access data in another view. This other view might be data on another detailed level (aggregation executed on more or less characteristics). The user may also seek to restrict or widen the filter criteria for characteristics. These different views might require additional data requested from the consumer side (FIG. 1. 140, 150 or 160) to the buffer layer (FIG. 1 130). To avoid unnecessary data request to the database, the buffer layer checks whether the data are already available in the buffer. It might be that parts of the requested data are available, and other parts are not available. In such cases it might be an adequate approach is to send a delta request (via the store layer 120) to the database layer 110. This is only possible if the buffer can integrate the result from the delta request with the available data. In case the filter was restricted, one might expect that the available data in the buffer allow returning the requested data without additional request to the database layer. Nevertheless this is not true in case that a key figure with aggregation rule NOP is requested, as the values on logical key level for this key figure are not the same if aggregated over the wider filter, and the values are the same if aggregated over the more restrictive filter. This phenomenon can be expressed in the abstract as follows. Aggregation on logical key level and integrating delta requests do not commute. One challenge for efficient buffers to solve the problem by passing request unchanged to database level if the request does not commutate and send delta requests in case these operations commutate and thus it saves computation time.

One type of data sources may support delta requests as e.g. a multidimensional data cube 111. Such a cube may be configured containing characteristics, such as product type, geographic sales region, time period, and key figures like sales volume, costs, sales quantity—the characteristics of a data source build the logical key of the data source. The data of this cube may be stored on database level with a technical key, which might be different from the logical key which is defined by the characteristics of the cube. By this it is possible to capture several data records for one logical key in the database. With such a configuration delta records can be handled in the cube. As there might be several records for one logical key, the normal aggregation functions on database level cannot be used if the aggregation has to be performed on level of a logical data row but in case of DSO the technical and the logical key are the same.

A second type of data sources might not support delta requests e.g. a DSO 112, which include a key figure with aggregation rule NOP. An example for such a data source is a DSO where the technical key might be the same as the logical key that may contain the same characteristics and key figures as the cube mentioned above. Nevertheless this data source may be configured in a way that the characteristics (the logical key) also represent the technical key and that the key, a combination of values of the characteristics, must be unique. By this it would not be possible to save several data records for one logical key on the database. So no delta records could be stored. In that case changes need to be consolidated to an after change image for such a data source. Additionally (but independent from the above described DSO configuration), the DSO might contain an additional key figure where the values of the key figure have to be aggregated according to the aggregation rule NOP during reporting or planning calculations.

The planning application may include a storage mechanism 120 which has specialized storage implementation (e.g. as a cache storage 121 and a storage managing calculation scenarios 122). The store mechanism is like an abstraction layer on the technical realization of the data sources and the way how data is accessed and changed.

In order to ensure consistency of data which are contained in buffer but are not locked, the caching mechanism takes into account that this kind of data can be changed in the meanwhile by another session. After every save-operation of data, the union of requested filters is stored in the database. During each read process, the logged filters will be checked for any intersection with the current filter. Hence, it is possible to determine whether data in buffer could have been invalidated. In this case, the data will be read from the database again. In some cases retrieving data might be cheaper (in terms of performance) than checking whether they were already retrieved. In other cases it might be cheaper to check whether data were already retrieved from the persistent layer. The cost of checking whether data were already retrieved depends on the cost of operation when filters are compared.

Here, the following compromise may be implemented. In a first step, data for the first filter (F1) is retrieved. In a second step, during a planning session data for a second filter (F2) is needed (e.g. as reference data for a planning function). In case it is "easy" to determine that filter F2 defines a subset of F1 data is taken from the buffer. If it is not easy to determine, the data for F2 is retrieved and this F2-data is integrated into the buffer. In case of intersections between F1 and F2, integration results in new records being added. If data are already available in the buffer, the new record is kept and the old record is ignored.

For data sources like DSO, it might be necessary to use the latest values of the data to be able to calculate the new values and save these changed values. For other data sources like cubes, it might be sufficient to save delta values.

In case that the union of filters cannot be used in place of the above procedure, data will be retrieved (for the new filter) from the database layer again. The union is computed on data level and not on filter level.

For some data sources best performance might be reached if read requests are minimized as far as possible. For such data sources the cache store (121 in FIG. 1) will manage the communication.

For such data sources the cache store will read the requested data into the application memory and decide at new requests whether the requested data is already in the cache or whether all the data or some parts of the data need to be requested from the database. To fulfill this task, a mechanism checks whether a new request is covered by a prior request and determines the delta request (this reads the missing parts from the database layer).

Some cases may re-read, in order to avoid time consuming operations in the cache administration.

As data might have been changed during the planning session (without that these changes have been saved), the cache store needs also take care that re-read data do not overwrite the changed data in the cache.

An example of the cache store may be implemented on application layer (e.g. using the Advanced Business Application Programming (ABAP) language available with databases from SAP AG of Walldorf, Germany).

A cache store which caches data (as in an ABAP implementation) is used to get better performance. The buffer mechanism controls that data is only retrieved from the database layer if the data are not already in the cache of the buffer, or if it is faster re-read the data again from the database layer instead of performing expensive operations on filters.

For some data sources the database layer might offer concepts to execute read and write requests with high performance on this layer. For such data sources, the Calculation Scenario Store (122 in FIG. 1) will manage the communication with the database layer.

Figure 6:
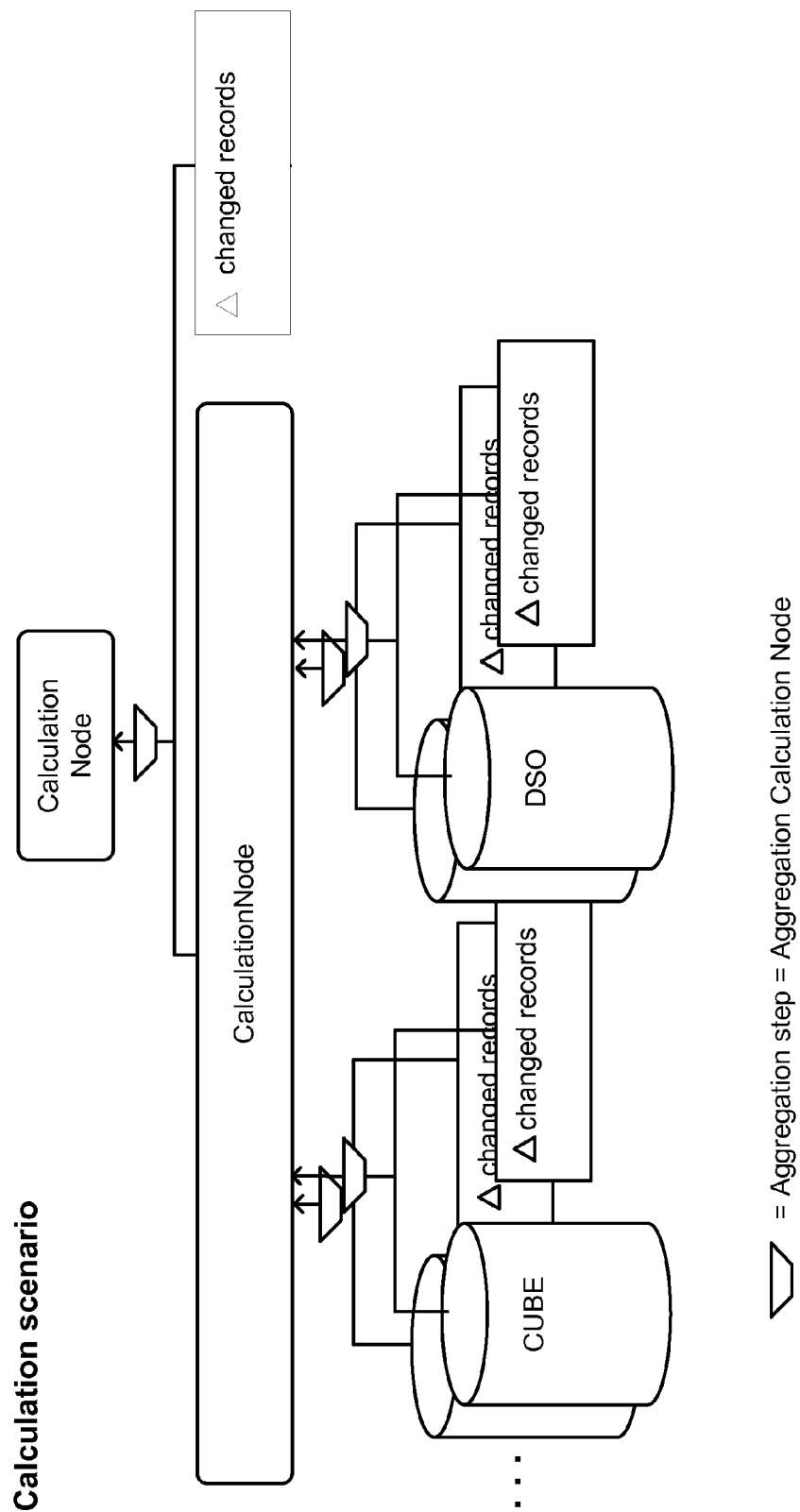
FIG. 6 illustrates a calculation scenario for a storage which uses capabilities on database level.

The subsequent read requests and data manipulation request during a planning session are captured in so called calculation scenarios. An example for such a calculation scenario is shown in FIG. 6). Calculation scenarios are managed by the Calculation Scenario Store.

The Calculation Scenario Store has the task to prepare and control all the operations which have to be performed on the database layer. To perform this task, calculation scenarios are defined and the execution is controlled by the buffer.

The Calculation Scenario Store controls the operations which have to be performed on database level to read the data from the database layer. At the start of a planning session these operations will typically define how the data shall be aggregated. During a planning session also changes of data (planning) and execution of planning functions will be added to the collection of operations in the Calculation Scenario Store. During the save-operation in case of the In Memory database the operations collected in the Calculation Scenario Store or the results of these operations will be made visible for other users.

There might also exist other data sources, where best performance can be achieved if some functions in the database layer are used and some data is cached in program memory or even in a specialized layer for data manipulation. For such data sources it is expected that additional specializations of the storage mechanism is required. The described concept is designed to integrate such additional storage specializations.

Figure 3:
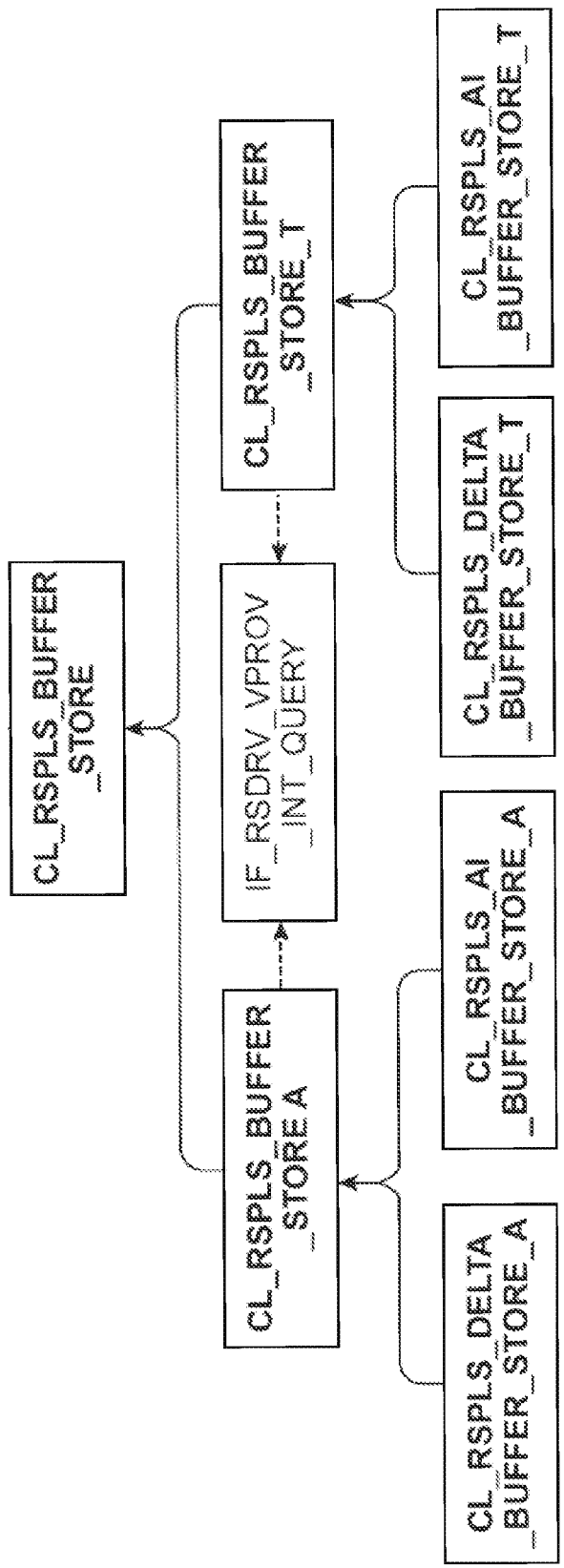
FIG. 3 shows a second class diagram for planning buffer stores.

FIG. 3 gives an example how the second idea can be implemented. The classes CL_RSPLS_BUFFER_STORE_A/T distribute their tasks to specific classes for different persistence layers. By this, the capabilities (e.g. of an In Memory database) can be used optimally. In this implementation, the advantages of an In Memory based database system are used by delegating as many as possible operations as aggregation, calculations in planning functions, and disaggregation, to distribute values to different objects to the HANA system. Only a handle is held in corresponding classes (CL_RSPLS_AI_BUFFER_STORE_T).

The planning application may include a buffer mechanism (FIG. 1. 130) which has specialized buffer implementation (e.g. as a delta buffer in FIG. 1. 131, and an after image buffer in FIG. 1. 132). Other buffers can be integrated if necessary. The buffer is a kind of abstraction layer on the semantic of the data in the data source and its capability to return and save data in different formats—e.g. delta records or after images.

The delta buffer 131 of FIG. 1 is now discussed. The delta buffer has the task to handle the communication between consumer tools and the store layer for data sources which allow to add delta records for a logical key on database level. This task can be fulfilled by calculating the deltas for all the key figures of a logical record (defined by the logical key).

The after image buffer has the task to handle the communication between consumer tools and the store layer for data sources which allow only one record for a logical key on the database. Here the buffer needs to calculate the after change values if delta values are passed from the consumer tools to the database layer.

This is particularly important for data sources with key figures aggregation rule NOP during reporting. There, the aggregation has to be done on level of the logical key (which is equal to the technical key for DSOs).

In the following, the difference between a delta buffer and an after image buffer (FIG. 1. 132) is discussed, as well as how the buffer answers requests.

One possible characteristic is that the data are held in the most detailed level. Namely the buffer structure contains the whole DSO structure.

Another possible characteristic is that the buffer receives delta(s), and then delivers after-image records. In order to keep track of changes done to the processed records, the buffer will get delta records. The buffer reads the before-image from the database. The buffer then computes the after-image by adding valid deltas to the before-image. Another possible characteristic is that the buffer already receives and/or contains after images. It might be necessary to ensure that only the changed data are adjusted during the save-operation.

Still another possible characteristic is that the buffer can return aggregated values. These aggregated values may have fewer characteristics than in the DSO. Under these circumstances, the buffer aggregates the data internally, and delivers the aggregated values.

Yet another possible characteristic for an after image buffer, is that the buffer architecture allows consumers (reporting, manual planning or planning functions—FIG. 1. 140, 150, 160 respectively) to access data in a homogeneous way. The implementation of the after image buffer is done specific in the different data source types.

Another possible characteristic of an after image buffer is that an internal caching mechanism may be used.

While the discussion focuses upon use of an after image buffer and a delta buffer, the concept is not limited to this particular approach. Other buffers for other storage types could also be used. Other buffers for other data sources could, for example, be data providers which contain key figures with other aggregation types (e.g. minimum, maximum) key figures with different aggregations for different dimensions to allow something like inventory management, where aggregation in dimension time is last value (in a time number series), and summation in other dimensions).

The concept allows integration of multi-providers (e.g. a join view on several data sources). Specifically, some data providers might support in memory database operations, while other data providers might support only classical disk-based database access. For example a multi-provider might comprise two cubes (whereof one works better (with respect to performance) with in memory operations and the other does not) and a DSO as third data source.

With this concept it is possible to include optimizations for different data sources and different application requirements, to delegate processing to the database layer or in the application layer, and to support different needs of data source with different specializations of buffers and stores. Within the described architecture, different strategies or heuristics could be implemented to decide whether a possible algorithmic performance gain in a layer other than the persistency layer of the data justifies some additional transport costs. In one implementation, decisions are made (e.g. 'a time consuming transport of huge data volumes just before the data is supposed to be saved is not acceptable', and to support that decision, certain properties of the providers come into the game), but also other strategies would still be possible within and supported by the describe concept.

Figure 1A:
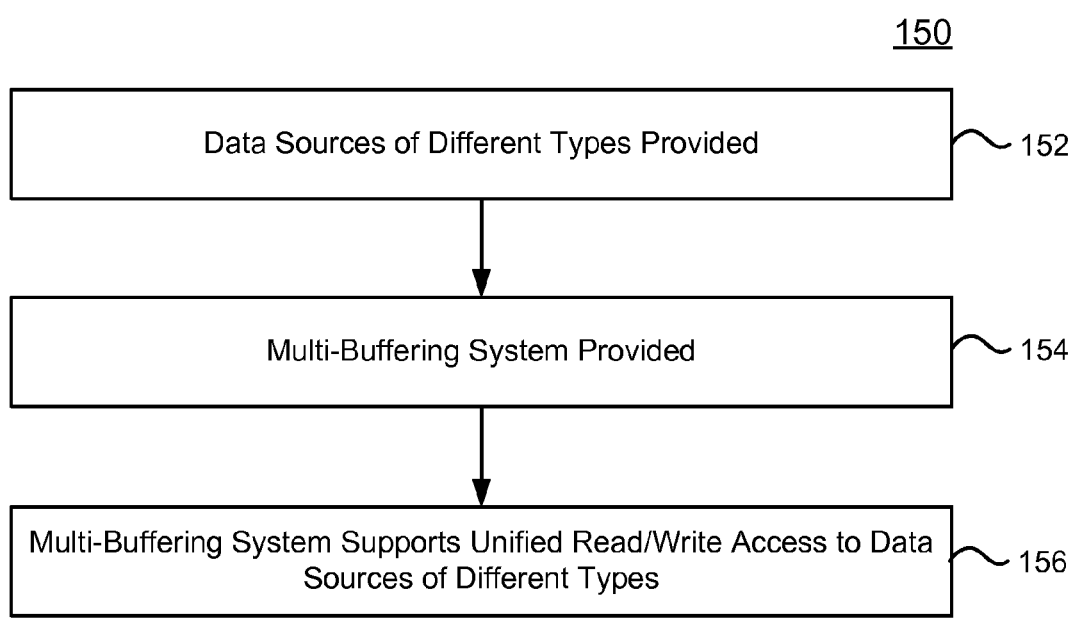
FIG. 1A is a simplified flow chart illustrating a method 150 according to an embodiment.
Figure 2:
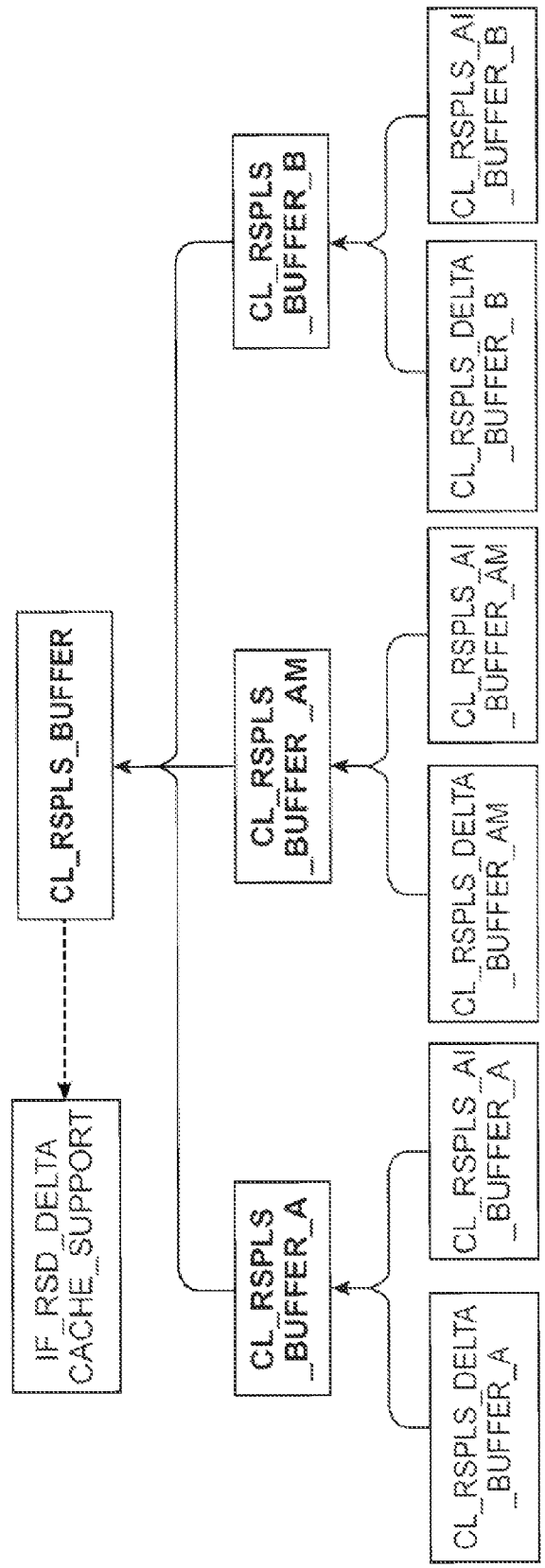
FIG. 2 shows a first class diagram for planning buffers.

FIG. 1A is a simplified flow chart illustrating a method 150 according to an embodiment. In a first step 152, data sources of different types are provided. In a second step 154, a multi-buffering system is provided. In a third step 156, the multi-buffering system supports unified read/write access to the data sources of different types.

Figure 5:
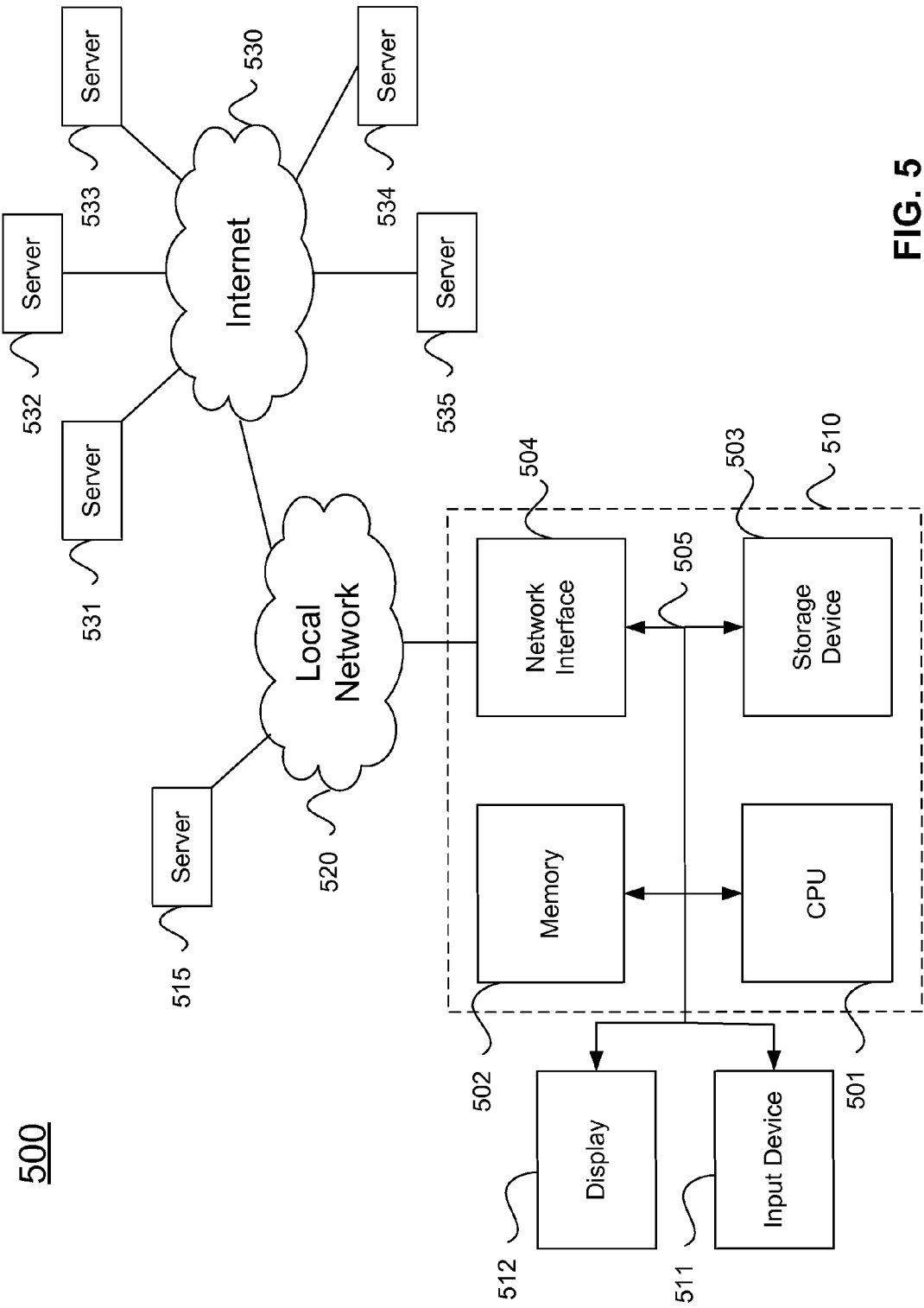
FIG. 5 illustrates an example of a computer system.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

An embodiment of a computer system comprises one or more processors and a software program executable on said computer system. The software program is configured to provide in a database layer, a first data source of a first type and a second data source of a second type different from the first data source type. The software program is configured to provide in an application layer in communication with the database layer, a multi-buffering system. The software program is configured to cause an abstract buffer component of the multi-buffering system, to support unified read/write access to the first data source and to the second data source by a consumer. In certain embodiments the software program is also configured to cause a storage mechanism of the multi-buffering system, to support unified read/write access to the first data source and to the second data source by the consumer. In some embodiments, the first data source comprises a multi-dimensional data structure; and the second data source comprises other than a multi-dimensional data structure. In various embodiments the abstract buffer component is specialized into a delta buffer configured to receive data read from access the first data source, and an after image buffer configured to receive data read from access the second data source. The after image buffer may be configured to support also a No Operation (NOP) aggregation rule. The storage mechanism is specialized into a cache store configured to write data to access the first data source, and a calculation scenario store configured to write data to access the second data source. The database layer may comprise an in memory database, and the calculation scenario store is configured to use functionality of the in memory database in order to manage a calculation scenario.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing in an in memory database layer, a first data source of a first type and a second data source of a second type different from the first type, wherein the first data source comprises a multi-dimensional data structure and the second data source comprises other than a multi-dimensional data structure;
providing in an application layer in communication with the in memory database layer, a multi-buffering system; and
causing an abstract buffer component of the multi-buffering system, to support unified read or write access to the first data source and to the second data source by a consumer;
wherein the abstract buffer component comprises a delta buffer configured to access the first data source, and an after image buffer configured to access the second data source, the abstract buffer component comprising a class distributing an operation comprising a current filter of a request from the consumer to the in memory database layer while retaining a handle,
wherein the first data source of the first type and the second data source of the second type manage a calculation scenario containing information to calculate data relevant in a planning session and all parameters to obtain changed data in the planning session, the first data source of the first type and the second data source of the second type configured to return in the planning session, relevant data in the changed state and store the relevant data in the changed state upon receiving the request,
wherein a storage mechanism passes the request unchanged to the in-memory database layer where the request does not commutate with a logged filter, the storage mechanism comprising a cache store configured to access the first data source, and a calculation scenario store configured to access the second data source; and
wherein the storage mechanism reads data from the in memory database rather than the abstract buffer where an intersection of the logged filter with the current filter is found.

2. The computer-implemented method of claim 1 further comprising:
causing the storage mechanism of the multi-buffering system, to support unified read/write access to the first data source and to the second data source by the consumer.

3. The computer-implemented method of claim 1 wherein the after image buffer is configured to support a No Operation (NOP) aggregation rule.

4. The computer-implemented method of claim 1 wherein the calculation scenario store is configured to use aggregation functionality of the in memory database in order to manage a calculation scenario.

5. A computer system comprising:
one or more hardware processors;
a software program, executable on said computer system, the software program configured to,
provide in an in memory database layer, a first data source of a first type and a second data source of a second type different from the first type, wherein the first data source comprises a multi-dimensional data structure, and the second data source comprises other than a multi-dimensional data structure;
provide in an application layer in communication with the in memory database layer, a multi-buffering system;
cause a storage mechanism of the multi-buffering system, to support unified read or write access to the first data source and to the second data source by a consumer,
wherein the storage mechanism comprises a delta buffer configured to access the first data source, and an after image buffer configured to access the second data source, the abstract buffer component comprising a class distributing an operation comprising a current filter of a request from the consumer to the in memory database layer while retaining a handle,
wherein the first data source of the first type and the second data source of the second type manage a calculation scenario containing information to calculate data relevant in a planning session and all parameters to obtain changed data in the planning session, the first data source of the first type and the second data source of the second type configured to return in the planning session, relevant data in the changed state and store the relevant data in the changed state upon receiving the request,
wherein a storage mechanism passes the request unchanged to the in-memory database layer where the request does not commutate with a logged filter, the storage mechanism comprising a cache store configured to access the first data source, and a calculation scenario store configured to access the second data source; and wherein the storage mechanism reads data from the in memory database rather than the abstract buffer where an intersection of the logged filter with the current filter is found.

6. The computer system of claim 5 wherein:
the calculation scenario store is configured to use aggregation functionality of the in memory database in order to manage a calculation scenario.

7. The computer system of claim 5 wherein the after image buffer is configured to support a No Operation (NOP) aggregation rule.

8. A non-transitory computer readable storage medium embodying a computer program for performing a method, said method comprising:
providing in an in memory database layer, a first data source of a first type and a second data source of a second type different from the first type, wherein the first data source comprises a multi-dimensional data structure and the second data source comprises other than a multi-dimensional data structure;
providing in an application layer in communication with the in memory database layer, a multi-buffering system;
causing an abstract buffer component of the multi-buffering system, to support unified read or write access to the first data source and to the second data source by a consumer;
wherein the abstract buffer component comprises a delta buffer configured to access the first data source, and an after image buffer configured to access the second data source, the abstract buffer component comprising a class distributing an operation comprising a current filter of a request from the consumer to the in memory database layer while retaining a handle,
wherein the first data source of the first type and the second data source of the second type manage a calculation scenario containing information to calculate data relevant in a planning session and all parameters to obtain changed data in the planning session, the first data source of the first type and the second data source of the second type configured to return in the planning session, relevant data in the changed state and store the relevant data in the changed state upon receiving the request,
wherein a storage mechanism passes the request unchanged to the in-memory database layer where the request does not commutate with a logged filter, the storage mechanism comprising a cache store configured to access the first data source, and a calculation scenario store configured to access the second data source; and
wherein the storage mechanism reads data from the in memory database rather than the abstract buffer where an intersection of the logged filter with the current filter is found.

9. The non-transitory computer readable storage medium of claim 8 wherein the method further comprises:
causing the storage mechanism of the multi-buffering system, to support unified read/write access to the first data source and to the second data source by the consumer.

10. The non-transitory computer readable storage medium of claim 8 wherein the after image buffer is configured to support a No Operation (NOP) aggregation rule.

11. The non-transitory computer readable storage medium of claim 8 wherein:
the calculation scenario store is configured to use aggregation functionality of the in memory database in order to manage a calculation scenario.

* * * * *